United States Patent [19]

Oberlander

[11] Patent Number: 5,476,274
[45] Date of Patent: Dec. 19, 1995

[54] PLATFORM ELEVATING VEHICLE SUSPENSION

[76] Inventor: James R. Oberlander, P.O. Box 1104, Eagle Point, Oreg. 97524

[21] Appl. No.: 278,841
[22] Filed: Jul. 22, 1994
[51] Int. Cl.⁶ ..................................................... B60P 1/08
[52] U.S. Cl. .................................... 280/43.17; 280/414.5; 414/495
[58] Field of Search ........................... 280/43.17, 414.5, 280/43; 414/495

[56] References Cited

U.S. PATENT DOCUMENTS

| | | | |
|---|---|---|---|
| 2,041,616 | 5/1936 | Noell et al. | 280/43.17 |
| 2,711,329 | 6/1955 | Fritz | 280/414.5 |
| 3,434,732 | 3/1969 | Heldenbrand | 280/43.17 |
| 4,154,352 | 5/1979 | Fowler | 280/43.17 |
| 4,428,435 | 1/1984 | Hubbard et al. | 280/414.5 |
| 5,161,814 | 11/1992 | Walker | 280/414.5 |

FOREIGN PATENT DOCUMENTS 1906165  10/1969  Germany ............................. 280/414.5

Primary Examiner—Margaret A. Focarino
Assistant Examiner—Carla Mattix
Attorney, Agent, or Firm—William H. Maxwell

[57] ABSTRACT

A wheeled suspension unit for elevating a vehicle platform from ground engagement to operational height, characterized by a lever that swings a wheel axis to and from alignment with a vertical plane extending between a raised fulcrum of the lever and a transverse axis of the vehicle, there being separate manually operable suspension units at opposite sides of the vehicle and each with a releasable latch for securing the elevated condition.

18 Claims, 3 Drawing Sheets

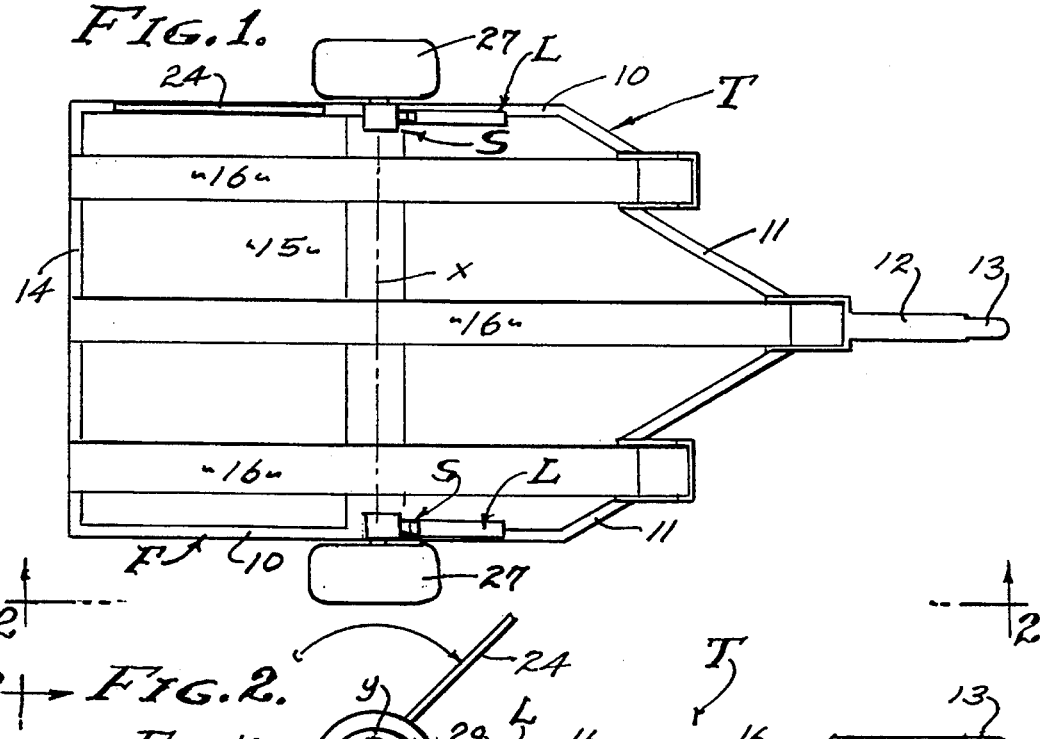
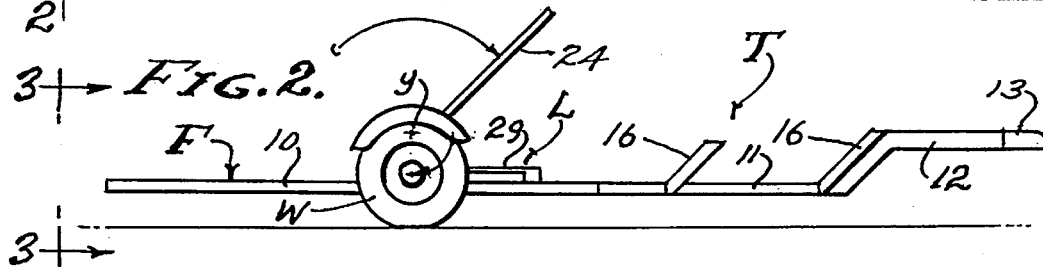
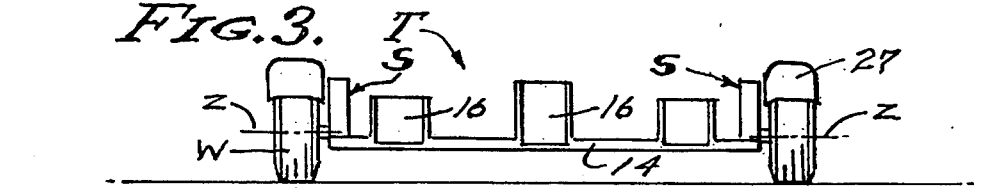
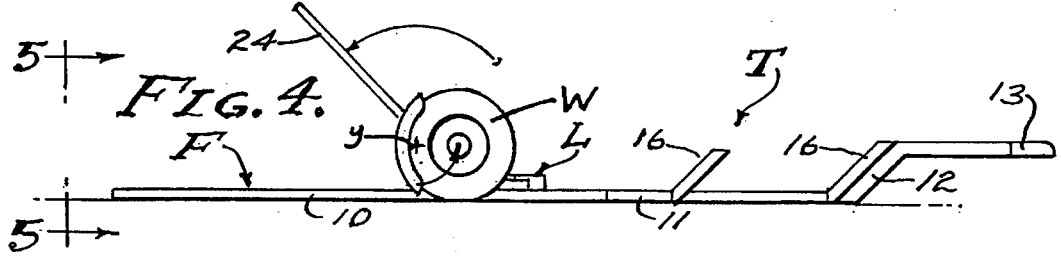
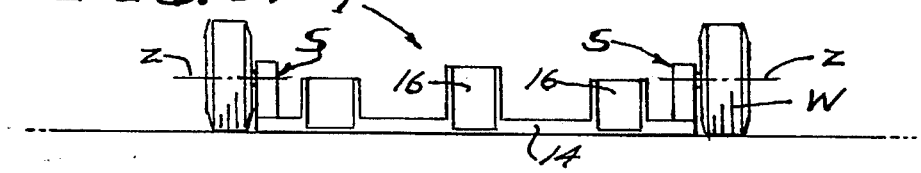

5,476,274

PLATFORM ELEVATING VEHICLE SUSPENSION

BACKGROUND OF THE INVENTION

This invention relates to load carrying vehicle platforms and particularly to the suspension therefor, it being a general object of this invention to elevate the platform from ground level to operational height from ground level and vice versa. It is a wheeled vehicle with which this invention is concerned, and as disclosed herein a most practical application is to a trailer for transporting motorcycles or "Bikes" and the like. However, it is to be understood that the suspension disclosed herein is applicable to other types of vehicles and has the advantage of lowering the load carrying platform thereof to ground level, in order to facilitiate loading and unloading.

Heretofore, vehicles such as wheeled trailers have been constructed with a fixed ground clearance. That is, the load carrying platforms are usually positioned fixed distance above ground or roadway level, and which requires lifting the load to and from the platform level. In the case of loading motorcycles or bikes, a six to twelve inch lift, is a difficult task. And for example, a usual heavy bike trailer will accomodate three such bikes. Therefore, and in order to facilitate loading and unloading of heavy bikes, it is an object of this invention to alternately raise and lower the vehicle or trailer platform to an from ground or pavement level. It is also an object to raise and lower the vehicle or trailer platform whether or not it is connected to a traction or towing vehicle. And, the height to which the platform is to be raised can vary as may be required, a low riding trailer being shown and described herein.

Vehicle suspensions can be unsprung or sprung, the former being the type employed herein, since motorcycles or bikes have sophisticated suspension systems that damp the shock forces transmitted from the pavement to the mass of the bikes carried on the trailer platform. However, it is an object of this invention to provide a trailer platform that is transversely flexible and sufficiently resilient to have a semi-sprung effect. Accordingly, the platform is characterized by a flexible perimeter frame that supports a transversely flexible and resilient platform. As will be described, this elevating suspension is comprised of a rigid lever system at each supporting wheel of the trailer.

The platform elevating vehicle suspension is comprised of separate right and left hand wheel suspension units, it being an object of this invention to provide a lever system having mechanical advantage to lift and lower the weight of at least three heavy bikes. In practice, the leverage employed is at least six to one, and this can be increased commensurate with the length of the power arm of the lever system, a first class lever being employed. An object and feature of this lever system is to provide infinite mechanical advantage at one end of the lever motion, by employing the toggle principle of operation, and whereby any displacement from the other end of lever motion increases the mechancial advantage commensurate with said displacement.

It is an object of this invention to provide lock means for releasably securing the lever system in a raised condition, and in which condition the lever system has maximized leverage for gentle release from said locked condition. it is also an object of this invention to provide an elevating vehicle syspension that is compact and reliable in its operation.

The foregoing and various other objects and features of this invention will be apparent and fully understood from the following detailed description of the typical preferred form and application thereof, throughout which description reference is made to the accompanying drawings.

THE DRAWINGS

FIG. 1 is a plan view of a platform trailer carried by the suspension of the present invention.

FIG. 2 is a side elevation of the trailer taken as indicated by line 2—2 on FIG. 1.

FIG. 3 is a rear end view of the trailer taken as indicated by line 3—3 on FIG. 2.

FIG. 4 is a side elevation of the trailer similar to FIG. 2, showing the trailer in a lowered condition.

FIG. 5 is a rear end view of the trailer taken as indicated by line 5—5 on FIG. 4.

Figure 8:
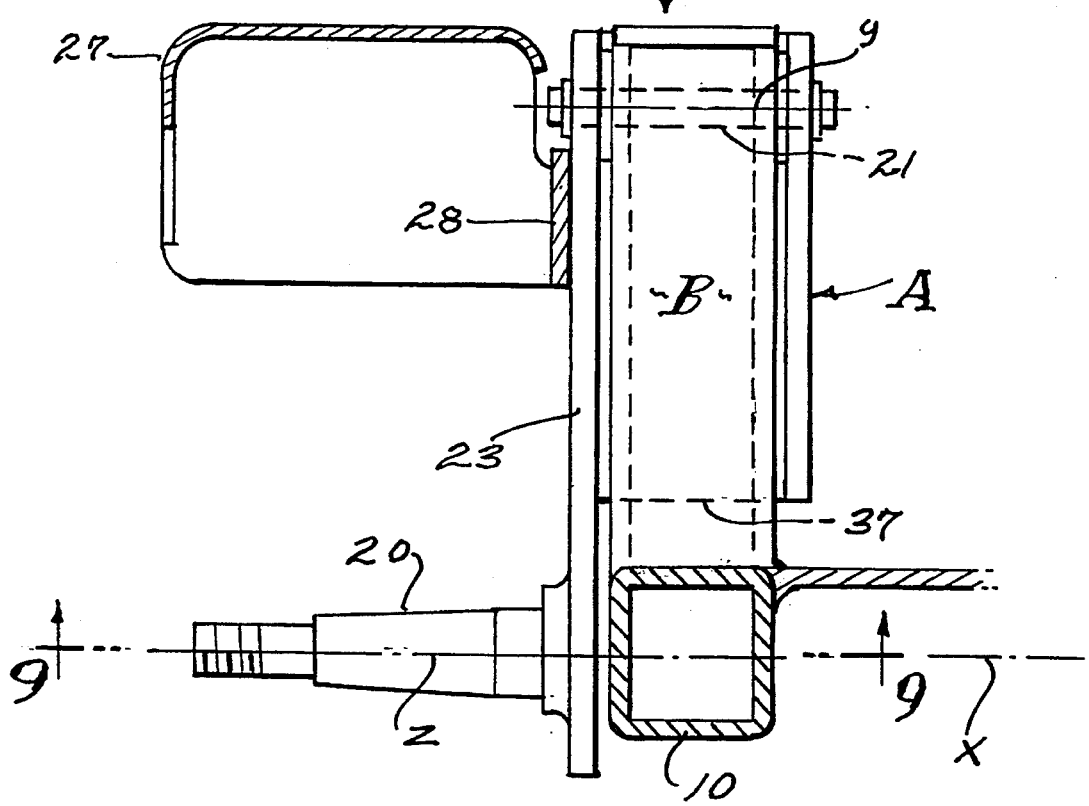
FIG. 8 is an enlarged detailed sectional view taken as indicated by line 8—8 on FIG. 6, with the wheel removed.
Figure 9:
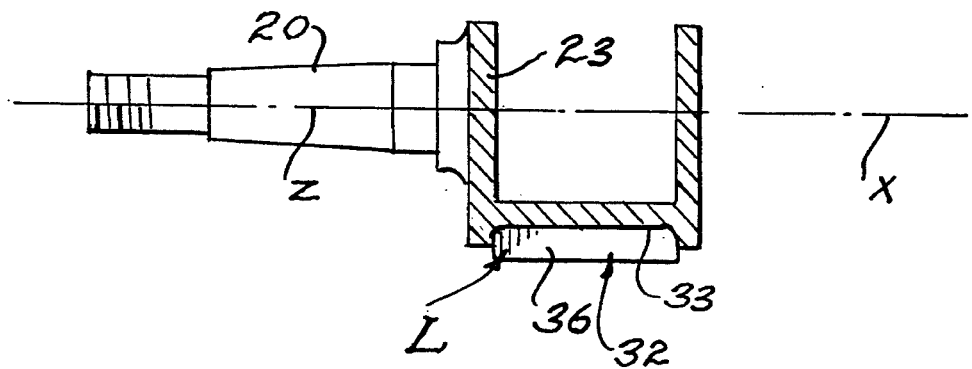

And, FIG. 9 is a detailed sectional view taken as indicated by line 9—9 on FIG. 8.

PREFERRED EMBODIMENT

Referring now to the drawings, the platform elevating suspension of the present invention is applied to a bike transport trailer T, as illustrated in FIGS. 1–5 of the drawings. As shown, the trailer is characterized by a planar platform comprised of a perimeter frame F having parallel opposite side rails 10 joined forwardly by convergent portions 11 to a tongue 12 with a tow hitch means 13 for connection to a traction vehicle (not shown). The tongue 12 rises above the plane of the platform and supports the platform at an operational height above and parallel to the ground or pavement level. The rear of the frame F has a transverse member 14, and the frame members 10, 11 and 14 are shown as being of square tube cross section at the top plane of which a planar platform member 15 provides a deck. As shown, there is an upwardly open channel 16 coextensive with and interrupting the longitudinal extent of the deck, there being three such channels 16 and each of which forms a track to guide and properly place the two wheels of each bike. One, two or three bikes can be transported, secured to the deck by tie-downs (not shown). The track-channels 16 are open at the rear where they interrupt the member 14, and they are inclined at their forward ends where they rise from the convergent portions 11 of the frame. The operational support axis x of the trailer is transverse and intermediate the front and rear of the trailer. The support axis x is coincidental with the wheel axis of the suspension unit S when it is in a raised transport condition, as shown FIGS. 2 and 3, and as detailed in FIG. 6.

Figure 6:
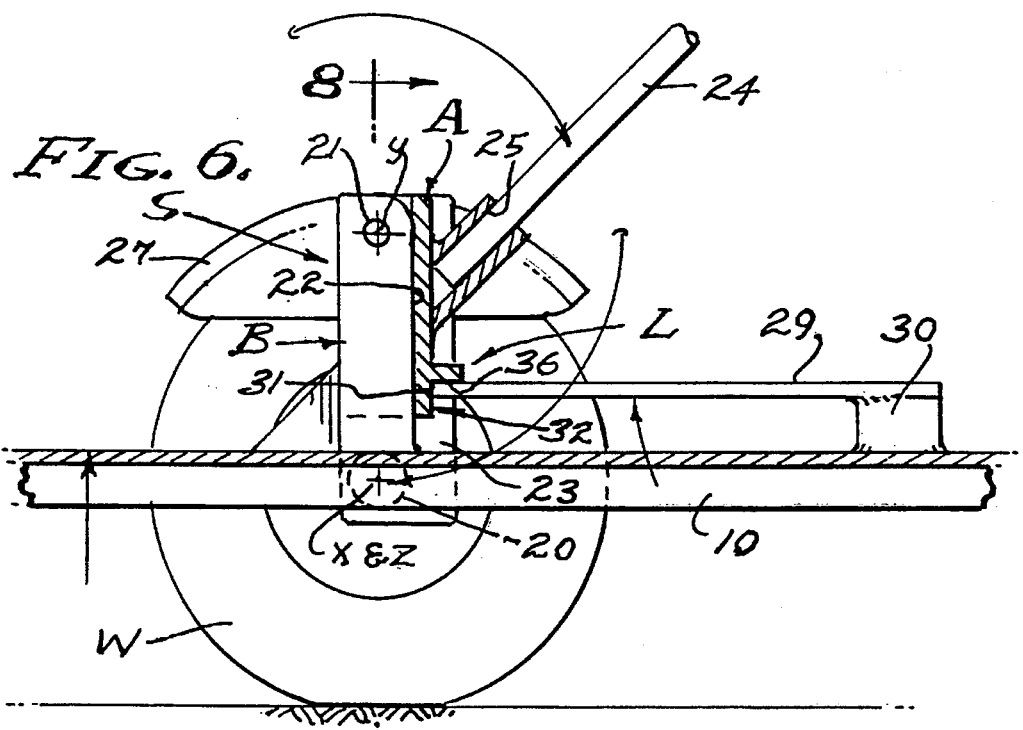
FIG. 6 is an enlarged detailed view of one of the suspension units in its elevated condition.
Figure 7:
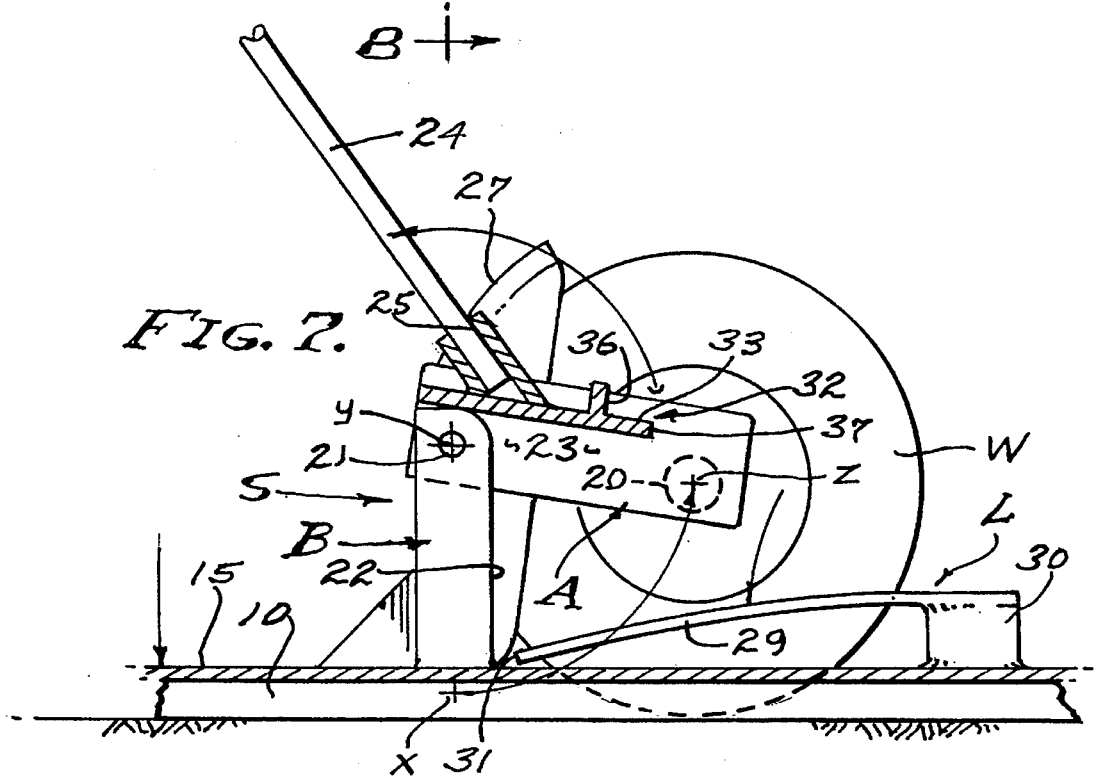
FIG. 7 is a view similar to FIG. 6, showing the suspension unit in its lowered condition.

The trailer T shown herein is a two wheeled vehicle with right and left suspension units S alignment with the support axis x, the right and left suspension units S being mirror opposites so that a description of one will suffice for the other, the left hand unit being detailed in FIGS. 6 and 7. And, it will be observed from the drawings that the suspension unit S is a combination of elements characterized by the compact relationship of a lever member A with a fulcrum y carried by a support member B, and a releasable latch means L for releasably securing the member A in a raised vehicle operation condition. The fulcrum y is positioned above the support axis x a distance as may be required for the elevation desired. And, the lever member A is pivoted at its upper end at the fulcrum y and carries an axle spindle 20 at its lower end on a swinging axis z. In accordance with this invention, the axis z can be raised, and lowered to be coincidental with the first mentioned support axis x.

The support member B can vary in design and is characterized by carrying the axis of fulcrum y above and in vertical alignment with the first mentioned support axis x. The distance between axes x and y is significant, as it determines the lift capability of the suspension unit S. For example, a distance of seven inches between axes x and y produces a suspension lift of seven inches, approximately as shown. Therefore, the trailer platform as it is shown herein has seven inches ground clearance when in its operating condition. In practice, the support member B is a tubular column that projects vertically from the side rail 10 of the frame F, its upper end carrying a fulcrum pin 21 on the fulcrum axis y. The axis is in vertical alignment with the support axis x as is clearly shown in FIGS. 6 and 7. A feature of this suspension is a stop for the lever member A, preferably a forwardly disposed stop face 22 on the support member B. In practice, the stop face 22 is coextensive with the height of the column-shaped support member B. Another feature is that the support member B is positioned at and/or over said rail 10, whereby the suspension support member B operates alongside and in close proximity to the frame rail 10. It is to be understood that the stop face 22 can be disposed rearwardly, if so desired.

The lever member A is the work arm 23 of a first class lever system that has a removable power arm 24 operable through a lift stroke of approximately 90°. That is, the lever system has a platform lowered position whereat the work arm 23 is approximately horizontally disposed in a forward direction (see FIG. 7), and has as platform raised position whereat the work arm 23 is vertically disposed in a downward direction (see FIG. 6). It will be observed that the work arm 23 operates as a toggle as it swings from the FIG. 7 position to the FIG. 6 position, whereby its mechanical advantage progressively increases to an infinite maximum at bottom dead center.

As shown in FIGS. 2 and 4, the power arm 24 is in the nature of a bar that is manipulated through an arc of approximately 90°, in order to lift the platform from the FIG. 4 condition to the FIG. 2 condition. The bar-lever 24 is removable, and is inserted into a socket 25 at the fulcrum portion of the lever system. As shown, the power arm 24 is upwardly standing and swings between fore and aft 45° inclined positions. As is indicated in FIG. 1, the bar-lever 24 can be stored upon the aft side rail 10 of the frame F.

In accordance with this invention, the work arm 23 shiftably carries the wheel axis Z at and alongside the frame rail 10 and upstanding support member B. In practice, the work arm 23 is of a "C" cross section that embraces the upstanding column of the support member B when in it stopped operating position (see FIGS. 6 and 9). Thus, the arm 23 is a rigid member that carries the wheel spindle 20, under compression as illustrated in FIG. 8 ( the wheel W removed). A fender 27 is carried by a gusset 28 attached to the upper portion of the arm, to shield the tire of the wheel, as shown throughout the drawings. A feature is the limited circumferential extent of the fender 27, whereby it clears the ground when the platform is lowered, as best illustrated in FIG. 7. Accordingly, the wheel W carried by spindle 20 swings between the extreme operating positions shown by FIGS. 2 and 4, and by FIGS. 6 and 7.

The latch means L is provided for securing the work arm 23 in its operating running condition as shown in FIGS. 2, 3 and 6. This means can vary in design and is preferably a releasable means. In practice, the latch means L is a spring latch comprised of a resilient leaf spring 29 anchored at its base end to the frame rail by a raised block 30 forward of the suport member B, and in a plane above the rail 10. The free distal end 31 of the spring 29 is disposed at the terminal end of swing of the work arm 23. The spring 29 resiliently returns to a horizontal condition as shown in FIGS. 2 and 6, with its distal end 31 engageable with a notch 32 at the lower end portion of the work arm 23. The notch 32 is therefore positioned radially from the fulcrum axis y and presents a forwardly faced shoulder 33 engageable with the distal end 31 of the latch spring 29 when the back face 34 of the work arm 23 is interfaced with the stop face 22 of the support member B (see FIG. 6). Upward travel of the spring 29 is limited by a downwardly faced shoulder 36 of the notch, when in the running condition shown. In order to permit release of the latch means L, the notch shoulder 33 terminates immediately below the leaf spring 29 when in its locking position, as is defined by the lower end 37 of the work arm 23. Release of the latch means L is by depressing the leaf spring 29 as shown in FIG. 7, whereby the notch 32 is released and so that the lowermost end 37 of the work arm 23 can swing forwardly and upwardly. Reversely, when the work arm 23 swings downward to the position shown in FIG. 6, the leaf spring 29 is inherently depressed until the distal end 31 thereof resiliently returns to its horizontal position engaged with the notch shoulder 33.

Operation of the lever system into a latched running condition as shown in FIGS. 1, 2 and 6 of the drawings, wherein the work arm 23 is lowered, is by forward manipulation of the inserted bar-lever power arm 24 through an arc of approximately 90°. The suspension units S are independently operable, the mechanical advantage being determined by the relative lengths of the power lever 24 and work lever 23 of the first class lever system. A locked running condition is assured by the releasable latch means L, with the platform frame F raised a determined distance above the ground or pavement surface as shown.

Operation of the lever system into a lowered vehicle loading condition is shown in FIGS. 4, 5 and 7 of the drawings, wherein the work arm 23 is raised by rearward manipulation of the inserted bar-lever power arm 24 through an arc of approximately 90°. Release of the latch means L is by stepping upon the leaf spring 29, applying body weight, near the free end of the spring, thereby depressing the distal end 31 from the notch 32 and displacing it below the end 37 of the work arm 23. This frees the arm 23 for forward-upward movement to its lowering condition of the platform frame F as shown.

Having described only the typical preferred form and application of my invention, I do not wish to be limited or restricted to the specific details herein set forth, but wish to reserve to myself any modifications variations that may appear to those skilled the art, as set forth within the limits of the following claims.

I claim:

1. A wheeled frame suspension unit for elevating the frame from ground level to vehicle operational height, and including;

a frame having a first transverse support axis, a support member projecting above the frame and having a stop face and a second transverse fulcrum axis disposed over the frame and parallel to the first mentioned support axis, a lever member rotatably pivoted on the second mentioned fulcrum axis and having a third wheel axis spaced radially from the second mentioned fulcrum axis, and releasable latch means for holding the lever member against said stop face and positioning the third mentioned wheel axis of the lever member in alignment with the first mentioned support axis for securing the frame at vehicle operational height, and releasable to permit swinging of the lever member out of said alignment for lowering the frame to ground level.

2. The wheeled vehicle frame suspension unit as set forth in claim 1, wherein the frame is embodied in a planar load bearing platform adapted to be elevated from ground engagement.

3. The wheeled vehicle frame suspension unit as set forth in claim 1, wherein the frame is embodied in a planar load bearing platform adapted to be elevated from co-planar ground engagement.

4. The wheeled vehicle frame suspension unit as set forth in claim 1, wherein the support member is a vertical column at a side of the frame, the second mentioned fulcrum axis being disposed in a vertical plane and above the first mentioned support axis.

5. The wheeled vehicle frame suspension unit as set forth in claim 1, wherein the releasable latch means positions the lever member for stopping the third mentioned wheel axis in alignment with the first mentioned support axis.

6. The wheeled vehicle frame suspension unit as set forth in claim 1, wherein the releasable latch means includes a depressible leaf spring disengageable with a notch on the lever member to hold the lever member against said stop face.

7. The wheeled vehicle frame suspension unit as set forth in claim 1, wherein the releasable latch means positions the lever member for stopping the third mentioned wheel axis in alignment with the first mentioned support axis, and wherein the releasable latch means includes a depressible leaf spring disengageable with a notch on the lever member to hold the lever member against said stop face.

8. A wheeled vehicle frame suspension unit for elevating the frame from ground level to vehicle operational height, and including;

a frame having a first transverse support axis, a support member projecting above the frame and having a stop face and a second transverse fulcrum axis disposed over the frame and parallel to the first mentioned support axis, a lever member rotatably pivoted on the second mentioned fulcrum axis and having a third wheel axis spaced radially from the second mentioned fulcrum axis, releasable latch means for holding the lever member against said stop face and positioning the third mentioned wheel axis of the lever member in alignment with the first mentioned support axis for securing the frame at vehicle operational height, and releasable to permit swinging of the lever member out of said alignment for lowering the frame to ground level, and a power lever to rotate the lever member between said alignment with the first mentioned support axis and a position swinging out of said alignment.

9. The wheeled vehicle frame suspension unit as set forth in claim, 8, wherein the power ever projects from the second mentioned fulcrum axis a distance greater than the lever member length.

10. The wheeled vehicle frame suspension unit as set forth in claim 8, wherein the power ever projects 45° from a vertical plane disposed between the first and second mentioned axes, when the third mentioned wheel axis of the lever member is aligned with the first mentioned support axis.

11. The wheeled vehicle frame suspension unit as set forth in claim 8, wherein the power lever projects from a socket carried by the lever member at a fulcrum portion thereof.

12. A vehicle frame suspension comprised of separate suspension units and at least one suspension unit at each side of the frame for elevating the frame from ground level to vehicle operational height and vice versa, each suspension unit including;

a frame having a first transverse support axis, a support member projecting above the frame and having a stop face and a second transverse fulcrum axis disposed over the frame and parallel to the first mentioned support axis, a lever member rotatably pivoted on the second mentioned fulcrum axis and having a third wheel axis spaced radially from the second mentioned fulcrum axis, and releasable latch means for holding the lever member against said stop face and positioning the third mentioned wheel axis of the lever member in alignment with the first mentioned support axis for securing the frame at vehicle operational height, and releasable to permit swinging of the lever member out of said alignment for lowering the frame to ground level.

13. The wheeled vehicle frame suspension unit as set forth in claim 12, wherein the frame is embodied in a planar load bearing platform adapted to be elevated from ground engagement.

14. The wheeled vehicle frame suspension unit as set forth in claim 12, wherein the frame is embodied in a planar load bearing platform adapted to be elevated from co-planar ground engagement.

15. The wheeled vehicle frame suspension unit as set forth in claim 12, wherein the support member is a vertical column at a side of the frame, the second mentioned fulcrum axis being disposed in a vertical plane and above the first mentioned support axis.

16. The wheeled vehicle frame suspension unit as set forth in claim 12, wherein the releasable latch means positions the lever member for stopping the third mentioned wheel axis in alignment with the first mentioned support axis.

17. The wheeled vehicle frame suspension unit as set forth in claim 12, wherein the releasable latch mans includes a depressible leaf spring disengageable with a notch on the lever member to hold the lever member against said stop face.

18. The wheeled vehicle frame suspension unit as set forth in claim 12, wherein the releasable latch means positions the lever member for stopping the third mentioned wheel axis in alignment with the first mentioned suport axis, and wherein the releasable latch means includes a depressible leaf spring disengageable with a notch on the lever member to hold the lever member against said stop face.

\* \* \* \* \*